United States Patent [19]

Le

[11] Patent Number: 5,614,087
[45] Date of Patent: Mar. 25, 1997

[54] WET OXIDATION SYSTEM

[75] Inventor: Tho-Dien Le, Willowdale, Canada

[73] Assignee: Kenox Corporation, Canada

[21] Appl. No.: 274,249

[22] Filed: Jul. 13, 1994

[51] Int. Cl.[6] .......................................................... C02F 1/72
[52] U.S. Cl. ........................ 210/180; 210/195.1; 210/197; 210/252; 210/258; 210/205; 210/761; 210/762; 422/189; 422/205; 422/228; 422/198; 422/235; 422/242
[58] Field of Search ..................................... 210/761, 762, 210/194, 195.1, 197, 252, 258, 180, 175, 205; 422/188, 189, 205, 226, 227, 228, 198, 234, 235, 242

[56] References Cited

U.S. PATENT DOCUMENTS

| | | |
|---|---|---|
| 2,690,425 | 9/1954 | Moses et al. . |
| 2,903,425 | 9/1959 | Zimmermann .......................... 210/761 |
| 3,060,118 | 10/1962 | Schoeffel ................................ 210/761 |
| 3,647,687 | 3/1972 | Matthiesen .............................. 210/761 |
| 3,761,409 | 9/1973 | McCoy et al. ........................... 210/761 |
| 3,808,126 | 4/1974 | Pradt ....................................... 210/761 |
| 3,870,631 | 3/1975 | Fassell et al. . |
| 3,920,506 | 11/1975 | Morgan .................................. 210/761 |
| 4,003,832 | 1/1977 | Henderson et al. . |
| 4,013,552 | 3/1977 | Kreuter . |
| 4,155,848 | 5/1979 | Sato et al. . |
| 4,229,296 | 10/1980 | Wheaton et al. ........................ 210/758 |
| 4,347,144 | 8/1982 | Bodenbenner et al. ................ 210/761 |
| 4,350,599 | 9/1982 | Chowdhury ............................. 210/761 |
| 4,543,190 | 9/1985 | Modell .................................... 210/761 |
| 4,604,215 | 8/1986 | McCorquodale . |
| 4,793,919 | 12/1988 | McCorquodale . |
| 5,262,060 | 11/1993 | Lehmann et al. ....................... 210/761 |
| 5,358,646 | 10/1994 | Gloyna et al. .......................... 210/761 |

FOREIGN PATENT DOCUMENTS

| | | |
|---|---|---|
| 491620 | 6/1992 | European Pat. Off. . |
| 2334994 | 1/1975 | Germany . |
| 706686 | 4/1954 | United Kingdom . |

*Primary Examiner*—Neil McCarthy
*Attorney, Agent, or Firm*—Young & Basile, P.C.

[57] ABSTRACT

An apparatus is provided for oxidizing an aqueous suspension of organic matter at elevated pressure. The apparatus has a reactor and an inlet for the aqueous suspension which is introduced to an upstream end of the reactor. A device for circulating the aqueous suspension through the reactor. An inlet for an oxygen containing gas introduced to the aqueous suspension. An outlet for removing treated aqueous suspension from a downstream end of the reactor and a static mixer vane arrangement for splitting, rearranging and combining the aqueous suspension as the circulating device circulates the aqueous suspension through the reactor. The improvement comprises withdrawing the treated aqueous suspension from the downstream end of the reactor and combining a major portion thereof with fresh incoming aqueous suspension. The circulating device returns the combined aqueous suspension to the reactor via the inlet for the aqueous suspension. A minor portion of the withdrawn aqueous suspension is disposed of while at the uppermost region of the reactor, spent gases are removed therefrom as separated from the aqueous mixture.

18 Claims, 2 Drawing Sheets

WET OXIDATION SYSTEM

FIELD OF THE INVENTION

This invention relates to process and apparatus for the wet oxidation of organic matter using oxygen-containing gases such as air.

BACKGROUND OF THE INVENTION

Destructive oxidation of organic materials in an aqueous medium has been employed because it provides a useful process for reducing the chemical oxygen demand of organics in water systems. This avoids the need to de-water the system in order to burn in a fuel system the organics. British patent 706,686 discloses a self-sustaining process for the destructive oxidation of organic materials in an aqueous medium. The system operates at a temperature above 450° F. and a pressure sufficient to maintain the water in liquid form so as to cause the organic material to be oxidized. Such pressures may be in the range of 1400 to 1500 pounds per square inch and the temperatures may be as high as 625° F.

Catalysts have been used in the system to catalyze the oxidation reaction, such as disclosed in U.S. Pat. No. 2,690,425. The system is operated at temperatures in the range of 100° C. to 350° C. under pressures of between 400 to 2500 pounds per square inch.

The reactor design for the wet oxidation system has been provided in many forms, such as disclosed in U.S. Pat. No. 3,870,631. The reactor is horizontally oriented and has several compartments to provide a series reactor arrangement. Agitators are used to provide a rubbing or abrasive contact between the combustible organic matter and the oxygen over a maximum area by reason of the high state of movement during agitation by the agitators. The agitators are power intensive in view of the speeds at which they must rotate to generate the degree of agitation required in the wet oxidation process of that patent, e.g. they may be rotated at speeds of 1300 rpm.

Another approach in agitating a liquid system is to use ultrasonic energy as disclosed in U.S. Pat. No. 4,013,552. Ultrasonic energy is transmitted to sewage which is at standard temperature and pressure. This treatment reduces the liquid particle size and enrobes the reduced water particles with air to enhance the biochemical oxidation by the aerobic bacteria. However, this patent does not contemplate the use of ultrasonic energy in the chemical oxidation of organic matter. Although U.S. Pat. No. 4,003,832 discloses the use of ultrasonic energy in chemical oxidation of organic matter, this patent requires the use of large concentrations of ozone in the area of the ultrasonic energy generator.

U.S. Pat. No. 4,155,848 discloses a vertical reactor tower for use in the wet oxidation of organic matter. The vertical tower has an outer cylindrical vessel with a smaller diameter concentric tube therein. The introduced organic matter and oxygen are circulated downwardly of the annular portion of the vessel and upwardly of the interior of the reactor core. The oxygen is introduced into the base of the inner tube so that in flowing upwardly, it causes a circulation of the aqueous medium in the system. This requires considerably increased supply of compressed air to cause the necessary circulation. The process, therefore, becomes cost ineffective because of the high capital and energy intensive system needed to compress this air. The system is normally operated at temperatures in the range of 250° C. to 374° C. The pressure is high enough to maintain the effluent in liquid phase.

U.S. Pat. No. 4,604,215 and 4,793,919 disclose reactor systems which have a reactor tower comprising an inner tube and an outer shell. A static mixer vane arrangement is provided within the inner tube. A circulating device is provided at the base of the reactor tower which withdraws liquid from the outer annular space and directs it upwardly of the inner space to thereby develop circulation of organic aqueous liquids through the reactor tower. Treated waste and liquid is withdrawn solely from the top of the tower and which is passed through a heat exchanger before the treated liquid is released. It is suggested in these patents that this arrangement can be set up in series where the treated waste liquid and gas together as withdrawn from the top of one tower are introduced to the side of the next tower. Circulation of the aqueous suspension is achieved individually within each tower. Although this system works very well with most types of aqueous suspensions, it has been found that the efficiencies are not quite as high as desired and hence a need for overall improved performance.

It is therefore an object of this invention to provide a reactor system in which the process is carried out in a manner to optimize the performance of the wet oxidation process carried out in reactors of the type described in the aforementioned U.S. Pat. Nos. 4,604,215 and 4,793,919.

SUMMARY OF THE INVENTION

In accordance with an aspect of the invention, an apparatus is provided for oxidizing an aqueous suspension of organic matter at elevated temperature and pressure. The apparatus has a reactor;

- means for introducing the aqueous suspension to an upstream end of the reactor;
- means for circulating the aqueous suspension through the reactor; means for introducing an oxygen-containing gas to the aqueous suspension;
- means for removing treated aqueous suspension from a downstream end of the reactor;
- the reactor houses a static mixer vane arrangement for splitting, rearranging and combining the aqueous suspension as the circulating means circulates the aqueous suspension through the reactor. The improvement comprises:
- the circulating means withdrawing the treated aqueous suspension from the downstream end, combining a major portion of the withdrawn treated aqueous suspension with fresh incoming aqueous suspension and returning the combined aqueous suspensions to the reactor via the introducing means for the aqueous suspension;
- means for removing a minor portion of the withdrawn aqueous suspension to provide the major portion of the treated aqueous suspension; and
- means for removing from an uppermost region of the reactor, spent gases which have separated from the aqueous mixture, the gas removing means removing spent gases without loss of pressure in the reactor.

According to another aspect of the invention, the reactor system for oxidizing an aqueous suspension of organic matter at elevated temperature and pressure is provided. The oxidization is accomplished by exposing the organic matter to an oxygen-containing gas in series connected reactors for a period sufficient to reduce chemical oxygen demand of the organic matter to a predetermined desired level. The system comprises:

two series connected reactors, each reactor having an inlet for aqueous suspension at an upstream end of the reactor and an outlet for treated aqueous suspension at a downstream end of the reactor, the outlet of a first reactor being connected to the inlet of the second reactor to transfer directly partially treated aqueous suspension from the first reactor to the second reactor and introduce thereby free radical components of the aqueous suspension, into the second reactor;

means for circulating the aqueous suspension, the circulating means withdrawing from the outlet of the second reactor treated aqueous suspension and recirculating the treated aqueous suspension to the inlet of the first reactor;

means for introducing an oxygen-containing gas to each of the reactors to promote oxidation of organics in the aqueous suspension, the oxygen introduction means being spaced from each reactor inlet;

means for removing a minor portion of treated aqueous suspension from the circulating means;

means for removing from an uppermost region of each reactor, spent gases whereby only aqueous suspension without spent gas is circulated from the first reactor to the second reactor;

the circulating means providing sole circulation of aqueous suspension through the two reactors;

each reactor housing a static mixer vane arrangement for splitting rearranging and combining the aqueous suspension as the circulating means circulates the aqueous suspension through the reactor;

the circulating means mixing fresh aqueous suspension with the recirculated aqueous suspension before return of aqueous suspension to the first reactor.

According to another aspect of the invention, an ejector may be used for liquid feed distribution in the reactors to further enhance the liquid dispersion and to minimize the amount of escaped oxygen from liquid phase into the vapor space located at the top of each reactor.

BRIEF DESCRIPTION OF THE DRAWINGS

Preferred embodiments of the invention are shown in the drawings wherein.

DETAILED DESCRIPTION OF THE PREFERRED EMBODIMENTS

The process and apparatus, according to this invention, are useful in most wet oxidation applications, such as in the disposal of sewage, slime, sludge and other organic waste including explosives. The oxidative combustion is controlled, as carried out under water, where the pressure is sufficient to minimize the production of steam during the reaction. By use of the static mixer arrangement in the reactor core, the overall reactor configuration is considerably simplified compared to the power intensive type such as disclosed in U.S. Pat. No. 3,870,631.

Figure 1:
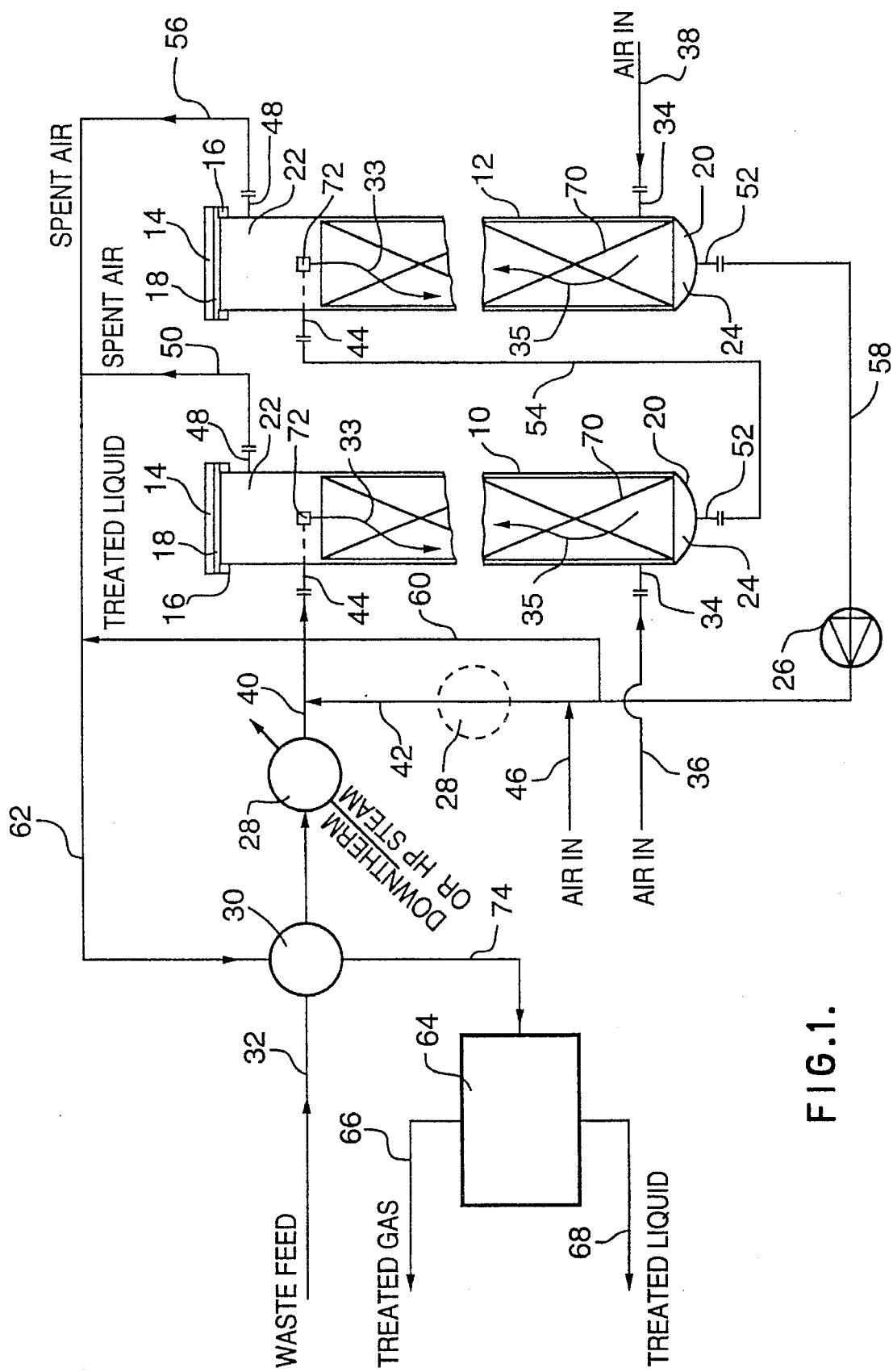
FIG. 1 is a schematic view of the reactor module for use in the wet oxidation of organic matter and in which the process, according to this invention, is carried out.

Considering the process as carried out in a preferred embodiment of FIG. 1, two vertically oriented pressure vessel reactors 10 and 12 are arranged in series, where the descriptions are common to both rectors 10 and 12. Generally the process carried out in the system arrangement of FIG. 1 oxidizes an aqueous suspension of organic matter to reduce their chemical oxygen demand concentration to a predetermined level is carried out at an elevated temperature and pressure by exposing the organic matter to an oxygen containing gas for a sufficient period of time. The process is carried out in a module which may comprise two reactors in series, having reaction zones which include a baffle arrangement which acts as a static mixer vane and means for circulating the aqueous suspension of organic matter through the static mixer vane arrangement. The reactor may operate at the elevated temperature and pressure which promote the oxidation of organic matter in the aqueous medium with minimal generation of steam. An oxygen containing gas is introduced into the aqueous suspension of organic matter. The aqueous suspension of organic matter and bubbles of oxygen containing gas are split, rearranged and combined in the static mixer as they are circulated through the static mixer by the circulating means to react the organic matter with the oxygen. The circulating means also provide the introduction of free radical to induce the reaction. The treated organic matter withdrawn from the reactor contains a reduced level of the chemical oxygen demand to the predetermined desired level. Means are provided for introducing an oxygen-containing gas into the reactors and for introducing an aqueous suspension of organic matter into an area of the reactors separate from where the oxygen-containing gas is introduced. The static mixer comprises a plurality of vanes arranged within the reaction zones to split, rearrange and combine the aqueous suspension of organic matter and oxygen-containing gas bubbles. Means is provided for withdrawing treated organic matter in aqueous suspension and gases from each reactor.

According to this preferred construction, the closed upper end 14 comprises an outer plate bolted to an annular ring which is welded to the pressure vessel 10. Sealing material 18 is used to engage the outer plane 14 to the annular ring 16. The bottom 20 has a cone shape or semi-spherical bottom which is welded to the vessel 10. The reactor 10 includes one or plurality of elements of the static mixer vane arrangement which occupy a portion of the length of the reactor 10 to define an upper vapor space 22 and a lower liquid space 24.

The external circulating pump 26 is so configured to circulate the oxidized aqueous suspension upwardly and blend with the incoming organic matter. The mixture flows downwardly through the static mixer arrangement and into contact with the oxygen-containing gas moving upwardly through the reactor.

On start-up, the reactors 10 and 12 are pressurized then heated to the operating pressures and temperatures respectively. In order to treat common industrial wastes, the operating temperatures are normally in the range of 200° C. to 250° C. and pressures in the range of 50 to 61 barg. However in treating waste from heavy oil and tar sands bitumen recovery systems, the systems may operate at pressures in the range of 210 barg and temperatures in the range of 320° C.

Normally, the reactors 10 and 12 are filled with normal water then pressurized to the desired operating pressure and heated up to the desired operating temperature by introducing compressed air to the reactors 10 and 12 and preheating the incoming feed through a Dowtherm® or high pressure steam preheater 28. When the system reaches the desired operating temperature, the high pressure aqueous waste stream is introduced to the reactor. The preheater 28 has two functions, starting-up and adding heat to the system. The latter will only be in effect when the system is operated in a non-automatic thermal mode. A heat exchange 30 is used to exchange heat between the hot treated waste liquid and/or gases with incoming waste materials. The waste to be treated is introduced to the heat exchanger 30 via line 32 and flows downwardly in the direction of arrow 33. The air is introduced to the reactor inlets 34 via lines 36 and 38 which flows upwardly within the reactors in the direction of arrow 35. The heated incoming waste stream emerges from the heat exchanger in line 40 and is commingled with the recycled treated waste from the reactor 12, line 42, then introduced to inlet 44 of the reactor 10. The ratio of the recycle stream flow to the fresh feed flow is set at certain level to provide an optimum back mixing within the reactors and residence time to sustain the oxidation reaction.

The air is introduced at the first location by inlets 34 for mixing with the downwardly travelling aqueous suspension. Optionally, there may be a second inlet 46 for introducing additional fresh oxygen-containing gas to the recirculation line 42.

Spent air from reactor 10 is purged through outlet 48 via line 50 to improve the diffusion of oxygen in the second reactor 12. The treated waste liquid is removed from the reactor via outlet 52 and introduced to inlet 44 of the second reactor 12, via line 54 for further treatment. Fresh oxygen-containing gas is introduced at inlet 34 of reactor 12 and the oxidation reaction continues throughout this reactor. Spent air from reactor 12 is purged through outlet 48, via line 56. The oxidized liquid is removed from the reactor 12 via outlet 52 and line 58. A net volume of the treated waste is withdrawn from the reactor system via line 60 and the remaining liquid is recycled back to the reactor 10 via the circulating pump 26 and line 42. The combined spent air streams from reactors 10 and 12, and the net volume of the treated liquid stream, line 62, exchange heat with the incoming untreated waste stream. In certain specific operations, there is no need to combine the treated liquid stream and the spent air stream. Heat recovery from these two streams can be tailored to meet the overall plant requirement. Depending on particular reaction conditions for a specific waste stream, additional cooling for treated material leaving exchanger 30 via line 74 may be required. This additional cooling can be in the form of air or water cooling. The non-condensable materials, mainly spent air, is removed from the treated liquid stream via a series of high and low pressure separators 64. The cooled spent air and cooled treated effluent emerge from the system via lines 66 and 68 respectively.

According to another aspect of the invention, the preheater 28 can be located in the reactor recycle loop, line 42, as shown in the broken line of FIG. 1. As the oxidation reaction is exothermic, excess heat generated within reactors 10 and 12 can be removed from this recycle loop.

The reactor includes a static mixer vane arrangement 70 which is secured and remains stationary within the reactors. The circulating pump 26 circulates downwardly the aqueous suspension over the static mixer within reactors 10 and 12 while bubbles of oxygen-containing gas, which may be air, travel upwardly. The vanes are shaped and configured in such a way to maximize the distribution and mixing of liquid and gas bubbles by rearranging and combining the stream. The liquid flows through the reactor cores in such a way that the organic matter and bubbles of oxygen-containing gas, which may be air, are split, rearranged in such a way to increase the interfacial area and expose fresh surfaces of the organic matter to oxygen and further oxidize the organic compounds. The static mixer vane arrangement extends from the bottom portion of the reactor upwardly a majority of the reactor length. Above the static mixer is the upper space 22 where spent air accumulates. In principle, there are no other vapor regions below the space 22 within the reactors.

According to a preferred embodiment of the invention, an ejector 72 is located at the internal extension of inlet 44 in the upper region 22 for liquid feed distribution in the reactors to further enhance the liquid dispersion and to capture the escaped oxygen from liquid phase into the vapor space 22 located at the top of each reactor.

The reactor 10 provides, according to this preferred embodiment, two reaction zones. A first reaction zone where the initiatory reactions occur. This zone is provided in the area where the untreated organic matter and recycled treated organic matter is exposed to oxygen in the vapor space and oxygen-containing gas bubbles travelling upwardly within the reactor. According to this invention, free radicals are introduced to reactors via the recycled stream containing treated organic matter. The second reaction zone where the oxidation reactions propagate through a fast reaction period and may be a portion of slow reaction period. This zone is defined in the area of the reactor which houses the static mixer. It is in this region where splitting and rearranging of liquid and absorption of oxygen-containing gas bubbles occur. The reactor 12 provided, according to this preferred embodiment, with a reaction zone where the fast reaction period is completed and the slow reaction period dominantly progresses and further oxidation of the organic matter takes place.

The static mixer may have a variety of vane configurations which are readily available in the marketplace. For example, the Statiflo® motionless mixer as distributed by Statiflo Inc provide an acceptable static mixer. Another example is the static mixer distributed by Koch Engineering Company Inc. Additional details of static mixers and their applications may be found in International Chemical Engineering, Volume 22, No. 2, April 1982, 197. The static mixer may also be in the form of certain standard baffle tray arrangement which is widely used in the chemical industries. For example, individual modules may each comprise alternating series of flat discs and annular rings where adjacent discs and annular rings are spaced apart a suitable distance to develop mixing pattern.

By use of the static mixer, the mixing of the components is accomplished with a minimum of power input, approximately one tenth of that required to operate the agitating devices of other units and achieve adequate mixing to oxidize extensively the materials.

The use of a motionless mixer providing extended surface area along its length lends itself readily to the use of catalysts for the oxidation reaction. The surface of the vanes of the static mixer can be formed of or include catalysts which, at these temperatures and pressure, catalyze the oxidation reaction. Suitable catalysts are metallic oxides of copper, nickel, cobalt, chromium, manganese, platinum, palladium, iron, cerium or silver. Mixtures of such oxides are useful, such as copper oxide/zinc oxide (50:50), copper oxide/chromium oxide/magnesium chromate (1:1:.004 by weight) and nickel oxide/nickel chromate (50:50). Other catalysts include magnesium sulphate and ammonium vanadate. Another catalyst mixture includes manganese/chromium/zinc (80/47/20).

The ratio of length to diameter of each reactor and the configuration of the static mixer are selected such that with the particular circulation rate of the pump 26, the superficial velocity of the aqueous suspension upwardly and the superficial velocity of gas downwardly over the net flow area of the reactor offer the optimum contacting time.

According to a preferred embodiment of the invention in treating normal organic industrial waste, the ratio of the cross-sectional area of flow area to the total area is in the range of 0.5 to 0.7.

Because of the unique reactor design, there is considerably lower capital costs in equipment as compared to other arrangements, higher yields are realized in chemical oxygen demand reduction compared to other reactor designs. By using the modular concept for the reactors, large COD reduction requirements for the waste material or wastes requiring longer retention times can be processed by adding additional series connected reactors to the system of FIG. 1. This provides a longer residence time in the system to achieve the desired COD reduction.

It has been found that the improvements, in accordance with this invention which involves the circulating device withdrawing the treated aqueous suspension from the downstream end of the reactor, are quite significant. Scale formation within the reactors diminishes significantly to almost nil. Separating the spent gases from the withdrawn aqueous suspension significantly enhances the treatment of the aqueous suspension. The withdrawn treated aqueous suspension is combined with fresh incoming aqueous suspension and returned to the reactor by the inlet thereto. In a series connected reactor, the withdrawn treated aqueous suspension is either advanced to the next reactor in the series or material drawn from the last reactor in the series is recirculated to the first reactor in the series. In this manner, the feed being introduced to each reactor in the series is being enriched with free radicals to maintain a high rate of reaction in each reactor and hence shorter residence time to achieve the desired COD reduction. A minor portion of the withdrawn treated aqueous suspension is removed without any spent gases therein and transferred for subsequent treatment. Furthermore in the improvement, in accordance with this invention, the spent gases are separated from the aqueous mixture by removing them from the uppermost region of the reactor. The removal of intermediate spent gases from the reactor increases the solubility of oxygen in the subsequent reactor aqueous suspension and thereby reduces the overall reactor volume significantly. The gases are removed from the reactor, as already noted, without the loss of pressure within the reactor. Depending upon the type of treatment to which the minor portion of the withdrawn aqueous suspension is subjected, the removed spent gases can be recombined with the minor portion of the withdrawn aqueous suspension.

The apparatus and process of this invention is capable of operating at the reduced temperatures and pressures for a wet oxidation system as compared to the substantially higher temperatures and pressures used in many of the prior art systems. In view of the unique aspects of the reactor, the system is considerably more economic and compared to some systems will cost one third of the prior systems. The reactor modules can be inventoried, thereby shortening delivery time. The circulation pump for use in circulating the aqueous medium requires about 10% of the power required to drive the agitators of the more complex, multi-chamber systems, such as disclosed in U.S. Pat. No. 3,870,631.

Figure 2:
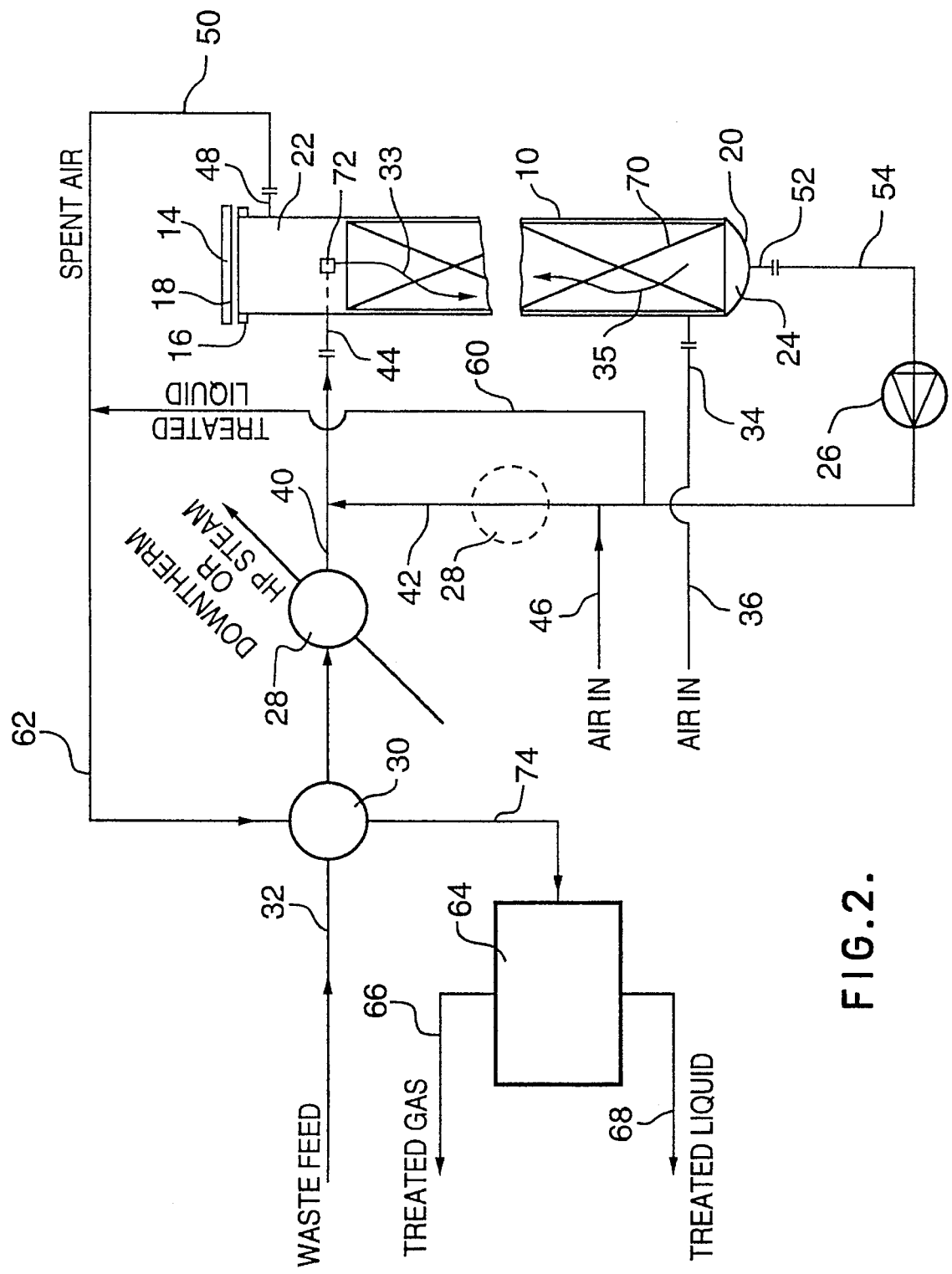
FIG. 2 is a schematic view of an alternative embodiment of the reactor module containing a single reactor defined therein in which the process, according to this invention, is carried out.

The alternative configuration of the reactor system design is shown in FIG. 2. This configuration may be used in the circumstance where the severity of the oxidation reactions is low or the waste containing organic matter is easily oxidized. In this configuration, the reactor module contains only one reactor 10 with similar design and configuration as the two previously described reactors. There is no intermediate spent air removal and the treated waste liquid in line 54 may be introduced directly to the recirculating pump 26. The rest of the flow direction is similar to FIG. 1. In this regard, the incoming waste feed is stepped up to reaction temperature through heat exchangers 28 and 30. The treated liquid, as removed from the base of the reactor, has a major portion thereof introduced to the waste feed coming in through line 40. A minor portion is removed in line 60 and may be combined with the spent gases removed from the top of the reactor in line 50 and passed through line 62 through heat exchanger 30 and line 74 into the gas liquid separator 64.

Other similarities are apparent in respect of similar numbers in FIG. 2 which are used to describe the same elements or process aspects as in FIG. 1. As already noted, the single reactor system of FIG. 2 cannot achieve the COD reductions as realized by the series reactor system of FIG. 1 which may contain two or more reactors in series. However, the concept of recirculating treated aqueous suspension as withdrawn from the lowermost portion of the reactor is beneficial in achieving a greater degree of COD reduction than could be realized by the prior art system such as that described in U.S. Pat. Nos. 4,604,215 and 4,793,919.

The reactor systems of FIGS. 1 and 2 may be custom designed or standardized modular designed units to meet the COD reduction requirement for and the through-put flow rate requirement for the incoming waste liquid. In circumstances where COD reduction and through-put are to be accommodated in the system of special size reactor(s), then the system of FIG. 1 or 2 can be custom designed to handle those special needs. However, in most circumstances, the COD reduction and through-put requirements can be accommodated by the standardized modular designed units. For example, if the COD reduction requirement or waste retention time is low and the through-put is low, then a single modular unit may be used. However, if the COD reduction requirement or retention time is high and through-put is low, then two or more modular units may be used in series. If the COD reduction requirement or retention time is low and the through-put is high, then two or more modular units may be used in parallel; i.e., the incoming feed is distributed amongst the two or more modular units of FIG. 2. In each parallel connected module, the waste is treated independently of the other reactor modules. If the COD reduction requirement or retention time is high and the through-put is high, then sets of series connected reactor modules of FIG. 1 may be connected in parallel; for example, the incoming feed may be distributed amongst 2, 3 or more sets of series connected reactors where, in each series set, there are two or more reactors connected in series. Hence the modular standardized approach to reactor set-up provides a very economical approach to treating waste feed in most situations.

Although preferred embodiments of the invention are described herein in detail, it will be understood by those skilled in the art that variations may be made thereto without departing from the spirit of the invention or the scope of the appended claims.

I claim:

1. In an apparatus for oxidizing an aqueous suspension of organic matter at elevated temperature and pressure, said apparatus having:

a reactor;

means for introducing the aqueous suspension to an upstream end of the reactor;

means for circulating the aqueous suspension through said reactor;

means for introducing an oxygen-containing gas to the aqueous suspension;

means for removing treated aqueous suspension from a downstream end of said reactor;

said reactor housing a static mixer vane arrangement for splitting, rearranging and combining the aqueous suspension as said circulating means circulates said aqueous suspension through said reactor;

the improvement comprising:

said circulating means withdrawing the treated aqueous suspension from said downstream end, combining a major portion of said withdrawn treated aqueous suspension with fresh incoming aqueous suspension and returning the combined aqueous suspensions to said reactor via said introducing means at said reactor upstream end for the aqueous suspension, said circulating, combining and returning means providing a ratio of recirculated aqueous suspension to fresh introduced aqueous suspension in a range between 10:1 to 50:1;

said means for introducing oxygen containing gas being located adjacent said downstream end of said reactor to provide for countercurrent flow of the gas relative to the flow of aqueous suspension;

means for removing a minor portion of said withdrawn aqueous suspension to provide said major portion of the treated aqueous suspension; and means for removing from an uppermost region of said reactor, spent gases which have separated from said aqueous mixture, said gas removing means removing spent gases without loss of pressure in said reactor.

2. In an apparatus of claim 1, said means for introducing aqueous suspension having an ejector for distributing the aqueous suspension into said reactor.

3. In an apparatus of claim 2, said reactor being vertically oriented, said downstream end being located lowermost, said means for introducing an oxygen containing gas being located adjacent said downstream end of the reactor.

4. In an apparatus of claim 3, further comprising means for introducing an oxygen containing gas into said major portion of the aqueous suspension before re-introduction to the reactor.

5. A reactor system for oxidizing an aqueous suspension of organic matter at elevated temperature and pressure by exposing the organic matter to an oxygen-containing gas in series connected reactors for a period sufficient to reduce chemical oxygen demand of the organic matter to a desired level, said system comprising:

two series connected reactors, each reactor having an inlet for aqueous suspension at an upstream end of said reactor and an outlet for heated aqueous suspension at a downstream end of said reactor, said outlet of a first reactor being connected to said inlet of said second reactor to transfer directly heated aqueous suspension from said first reactor to said second reactor and introduce thereby free radical components of said aqueous suspension, into said second reactor;

means for circulating the aqueous suspension, said circulating means withdrawing from said outlet of said second reactor treated aqueous suspension and recirculating the treated aqueous suspension to said inlet of said first reactor;

means for introducing an oxygen-containing gas each of said reactors to promote oxidation of organics in the aqueous suspension, said oxygen introduction means being spaced from each said reactor inlet, said means for introducing an oxygen containing gas being located adjacent said downstream end of said reactor to provide a counter current flow of the gas relative to the flow of aqueous suspension;

means for removing a minor portion of treated aqueous suspension from said circulating means providing a ratio of recirculated aqueous suspension to fresh introduced suspension in the range 10:1 to 50:1;

means for removing from an uppermost region of each said reactor, spent gases whereby only aqueous suspension without spent gas is circulated from said first reactor to said second reactor;

said circulating means providing sole circulation of aqueous suspension through said two reactors;

each reactor housing a static mixer vane arrangement for splitting rearranging and combining the aqueous suspension as said circulating means circulates said aqueous suspension through said reactor; and said circulating means mixing fresh aqueous suspension with the recirculated aqueous suspension before return of aqueous suspension to said first reactor.

6. A reactor system of claim 5 further comprising means for introducing an oxygen-containing gas to said circulating means.

7. A reactor system of claim 5 wherein said circulating means includes a pump.

8. A reactor system of claim 5 wherein said means for withdrawing the minor portion of treated aqueous suspension combines the withdrawn portion of aqueous suspension with the withdrawn spent gas before discharge from said reactor system.

9. A reactor system of claim 5 wherein each of said reactors is vertically oriented, said spent gas removal means being provided at the top of each of said reactors, said oxygen-containing gas introduction means being provided adjacent the downstream end of each of said reactors to permit thereby gas bubbles to float upwardly countercurrent to downward flow of aqueous suspension through said static mixer vane arrangement.

10. A reactor system of claim 9, wherein each of said reactors is a tubular vessel, said static mixer vane arrangement extending from adjacent said inlet to adjacent said outlet of each reactor said static mixer vane having extended surface area containing a catalyst selected from the group consisting of metaloxides of copper, nickel cobalt, chromium, manganese, platinum, palladium, iron, cerium or silver, magnesium sulphate and ammonium vanadate.

11. A reactor system of claim 10, wherein said static mixer vane arrangement comprises separate modules which are stacked within each said reactor.

12. A reactor system of claim 10, wherein said uppermost portion of each said reactor comprises a gas collection space above said inlet, said spent gas removal means being in communication with said gas collection space.

13. A reactor system of claim 10 wherein said inlet for each said reactor includes an ejector for distributing the aqueous suspension into said static mixer vane arrangement.

14. A reactor system of claim 12, wherein said circulating means includes a variable speed pump, said pump circulating the aqueous suspension through the reactor to provide a total residence time in the range of 30 minutes to 120 minutes.

15. A reactor system of claim 14 wherein a heat exchange system inputs sufficient heat to said reactor system to provide operating temperatures in the range of 150° C. to 350° C.

16. A reactor system of claim 15 wherein said pump develops operating pressures in the range of 40 barg to 250 barg.

17. A reactor system of claim 16 wherein a ratio for cross section area of each reactor to total area of reactor is in the range of 0.5 to 0.7.

18. A reactor system of claim 14 wherein said outlet for each reactor is provided at a lowermost portion of collector beneath said static mixer vane arrangement whereby sludge build up beneath said static mixer vane arrangement is minimized.

\* \* \* \* \*